United States Patent
Deng et al.

(10) Patent No.: US 11,358,551 B1
(45) Date of Patent: Jun. 14, 2022

(54) INSTRUMENT PANEL MOUNTED DRIVER AIRBAG

(71) Applicant: Ford Global Technologies, LLC, Dearborn, MI (US)

(72) Inventors: Zhibing Deng, Northville, MI (US); Tzu-Chen Weng, Troy, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/118,528

(22) Filed: Dec. 10, 2020

(51) Int. Cl.
*B60R 21/205* (2011.01)
*B60R 21/233* (2006.01)
*B60R 21/2338* (2011.01)

(52) U.S. Cl.
CPC .......... *B60R 21/205* (2013.01); *B60R 21/233* (2013.01); *B60R 21/2338* (2013.01); *B60R 2021/23308* (2013.01); *B60R 2021/23324* (2013.01); *B60R 2021/23382* (2013.01)

(58) Field of Classification Search
CPC . B60R 21/205; B60R 21/233; B60R 21/2338; B60R 21/231; B60R 2021/23308; B60R 2021/23382; B60R 2021/23324; B60R 2021/23316
USPC ...................................... 280/732, 729, 743.1
See application file for complete search history.

(56) References Cited

U.S. PATENT DOCUMENTS

| 4,181,325 | A | * | 1/1980 | Barnett | B60R 21/233 137/852 |
| 7,108,279 | B2 | * | 9/2006 | Rensinghoff | B60R 21/231 280/732 |
| 9,827,939 | B1 | * | 11/2017 | Roychoudhury | B60R 21/239 |
| 2006/0232050 | A1 | * | 10/2006 | Kumagai | B60R 21/231 280/730.1 |
| 2016/0244016 | A1 | * | 8/2016 | Takeshita | B60R 21/231 |
| 2019/0061673 | A1 | * | 2/2019 | Jaradi | B60R 21/207 |
| 2019/0077356 | A1 | * | 3/2019 | Patel | B60R 21/231 |
| 2019/0161044 | A1 | * | 5/2019 | Schneider | B60R 21/203 |
| 2021/0024026 | A1 | * | 1/2021 | Deng | B60R 21/231 |

FOREIGN PATENT DOCUMENTS

| DE | 19860804 A1 | 7/2000 |
| DE | 202006001826 U1 | 5/2006 |
| DE | 102012011664 A1 | 12/2012 |
| JP | 09011837 A | 1/1997 |
| JP | 2011037398 A | 2/2011 |
| KR | 19980048845 U | 10/1998 |
| WO | 2019135861 A1 | 7/2019 |

* cited by examiner

*Primary Examiner* — Keith J Frisby
(74) *Attorney, Agent, or Firm* — Frank A. MacKenzie; Bejin Bieneman PLC

(57) ABSTRACT

An airbag system includes an airbag and an inflator positioned in an instrument panel. The airbag includes a first chamber and a second chamber spaced from the instrument panel by the first chamber. A plurality of tethers is positioned within the second chamber. Each tether is coupled between a central area of a lower side and a central area of an upper side. A first and second lower extensions and a first and second upper extensions extend from the lower side and the upper side of the airbag, respectively.

21 Claims, 6 Drawing Sheets

INSTRUMENT PANEL MOUNTED DRIVER AIRBAG

BACKGROUND

Technical Field

The present disclosure is directed to an airbag housing having an airbag and an inflator mounted in an instrument panel.

Description of the Related Art

Airbags are inflated in certain collisions to provide supplemental restraints to an occupant. In many vehicles, front impact airbags are housed within a steering wheel hub. Some airbags inflate with a circular configuration in accordance with the shape of the steering wheel and include an instrument panel facing surface that abuts the steering wheel. The shape of the airbag overlaps with a reaction surface of the steering wheel and provides a reaction surface for the airbag.

BRIEF SUMMARY

Some vehicles include compact, non-circular steering wheels that provide extra cabin space and leg room. The non-circular steering wheels have less surface area and do not include much support for traditional airbags in both before and after deployment circumstances. The present disclosure is directed to an airbag system that is deployed from an instrument panel and includes extensions that are around the non-circular steering wheels to reduce movement of the airbag during an impact.

The airbag system is coupled to an instrument panel, which is coupled to a steering wheel. An airbag housing is in the instrument panel and includes an airbag and an inflator. The steering wheel may be an at least partly non-circular steering wheel. The airbag is coupled to the instrument panel through a mounting mechanism that is part of the housing such that the airbag inflates and deploys from the instrument panel in a direction of a vehicle occupant or driver. Particularly, the instrument panel and the steering wheel provide support to at least a portion of the airbag when deployed and assist in an effective energy absorption of the vehicle occupant during an impact. In one example, the airbag includes a first chamber, a baffle, and a second chamber coupled to the first chamber. The second chamber is separated from the first chamber by the baffle. The baffle is positioned between the instrument panel and the steering wheel.

The airbag further includes a first lower extension on a first side of the steering wheel and a second extension on a second side of the steering wheel. The first extension extends laterally along a left, lower side of the airbag. The second lower extension extends laterally along a right, lower side of the airbag. The first extension is spaced from the second extension by the steering wheel, in a way that at least a portion of the first extension and at least a portion of the second extension conforms and wraps around the steering wheel. Accordingly, a central portion of the steering wheel is laterally positioned between the first extension and the second extension. This arrangement keeps the airbag centrally positioned with respect to the steering wheel during inflation, which positions the airbag in front of the occupant when deployed. A third upper extension is aligned with the first extension and a fourth upper extension is aligned with the second extension, which are aligned with the occupant's shoulders.

The airbag system has a plurality of tethers within the second chamber such that each tether is coupled between a central area of the lower side and a central area of the upper side. These tethers create a curved surface that receives the occupant and in part, form the third and fourth extensions.

The present disclosure provides an airbag system for vehicles having a non-circular steering wheel, such that an airbag when deployed, provides an effective reaction force supported by at least a portion of the instrument panel and the steering wheel.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicle interior components have not been shown or described in detail to avoid unnecessarily obscuring descriptions of the embodiments.

Figure 1:
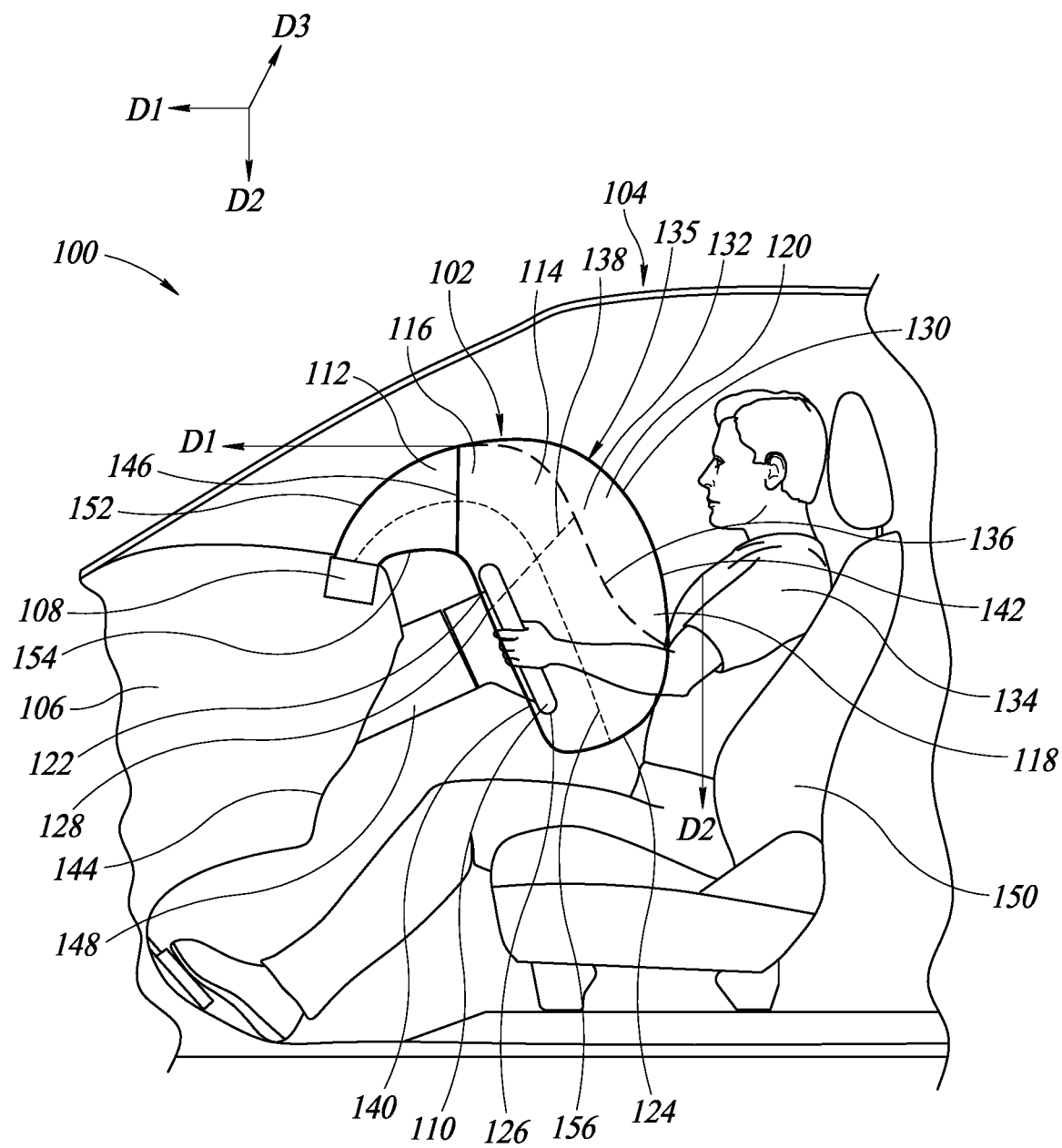
FIG. 1 is a side view of a deployed airbag in a vehicle interior in accordance with an embodiment of the present disclosure.

FIG. 1 is a side view of an airbag system 100 having an airbag 102 deployed in a vehicle interior 104, in accordance with an embodiment of the present disclosure. The vehicle includes an instrument panel 106 and an airbag housing 108 located in the instrument panel 106, such that the airbag 102 is housed inside the airbag housing 108 with an inflator (not shown). The vehicle interior 104 includes a steering wheel 110 coupled to a steering column 148 and an occupant seat 150 with an occupant 134.

In the event of a vehicle impact, for example a frontal collision, the inflator is activated and supplies an inflation gas to the airbag 102 to deploy the airbag 102.

The airbag 102 is deployed into the vehicle interior, away from a windshield with respect to the instrument panel 106, such that at least a portion of the airbag 102 wraps around a portion of the steering wheel 110 creating an energy absorption structure.

The steering wheel may be a truncated steering wheel 110 (see FIG. 4) such that the airbag 102 includes features that extend over the top and sides of the steering wheel when deployed. As in FIG. 1, from a side view the airbag has a D-shape, such that an instrument panel facing surface 140 of the airbag is planar as compared to an occupant facing surface 142, which is curved toward the occupant.

In one embodiment, a first chamber 112 of the airbag 102 couples to the housing in the instrument panel 106 and a second chamber 114 is spaced from the instrument panel 106 along a first direction D1. A baffle 146 is positioned between the first chamber 112 and the second chamber 114 such that the two chambers 112, 114 remain in fluid communication with each other. The baffle 146 includes a plurality of openings (not shown) that allow passage of the inflation gas from the first chamber 112 to the second chamber 114. For instance, in the event of vehicle impact, the inflation gas enters the first chamber 112 and passes to the second chamber 114 through the openings of the baffle 146.

The first chamber 112 is stiffer as compared to the second chamber 114. The stiffness will be impacted by the shape and dimensions of the first chamber and the baffle 146. A size of the openings in the baffle 146 and a material selected for the baffle 146 can impact the stiffness of the first chamber 112. In one embodiment, a material of the first chamber 112 is thicker, less flexible, or more stiff than a material of the second chamber 114. As a result, the first chamber 112 provides extra support and stability to the second chamber 114 when the occupant 134 interacts with the second chamber 114.

In one embodiment, the airbag 102 may include a first panel of material 152 and a second panel of material 154, such that the first panel of material 152 and the second panel of material 154 are coupled. The first and second panel collectively extend from the airbag housing 108 during deployment. The airbag housing 108 mounts to a surface 144 of the instrument panel 106 that is closer to the occupant than other surfaces of the instrument panel. The airbag housing may be in a recess that is within the instrument panel.

The first panel of material 152 and the second panel of material 154 form the airbag 102. In one example, the coupling of the first panel of material 152 and the second panel of material 154 is a seamless structure. However, in another example, a structural seam 156 couples the first panel of material 152 to the second panel of material 154. The first panel of material 152 conforms to at least a region of the geometry of the airbag 102 in a deployed state, such that at least a portion of the first panel of material 152 forms the occupant facing surface 142 while the second panel of material 154 remains in proximity to the instrument panel 106. The second panel of material 154 is the instrument panel facing surface 140.

The second chamber 114 also includes a plurality of tethers 138, where each of the plurality of tethers 138 are substantially symmetrical to each other. In FIG. 1, only one tether of the plurality of tethers 138 is illustrated. The plurality of tethers 138 is positioned between the instrument panel facing surface 140 and the occupant facing surface 142. Each of the plurality of tethers 138 couples between the central area 128 of the lower side 122 and the central area 132 of the upper side 120 of the airbag 102. The plurality of tethers 138 are internally attached within the second chamber 114 to an inner wall of the second panel 154. This attachment point at the central area 128 is spaced from the baffle 146 by a distance and is aligned with an upper portion of the steering wheel in a deployed state. Each tether may be a fabric strip, a rope, or other suitable material to couple the occupant facing surface so that a recess surface 136, which is further from the occupant than surface 135.

The plurality of tethers 138 creates a shape of the airbag 102 when deployed or inflated, which includes a curved surface and first and second extensions aligned with the occupant's shoulders. In an embodiment, two sections correspond to the shoulder of the occupant 134 and a central section, between the two shoulder sections corresponds to a head and a chest of the occupant 134.

In another example, the airbag 102 includes a U-shaped region including a left extension, a right extension, and a curved surface, forming a valley region (shown in detail in FIG. 3) between the left and right extensions. In yet another example, the airbag includes a substantially concave-convex shape, including a left convex surface, a right convex surface and a valley-like concave surface between the left and right convex surfaces. The left and right convex surfaces form left and right shoulder restraining portions and the valley-like concave surface is centrally aligned with the occupant.

The material of the two chambers 112 and 114 is the same in one embodiment, such that parameters such as differential pressure, varying volumes may be employed to vary the stiffness by selecting appropriately at least a shape or a size of the one or more openings in the baffle 146. For instance, to increase the stiffness of the first chamber 112 during deployment of the airbag 102, a diameter of the openings in the baffle is made small to control the flow of inflation gas to the second chamber 114.

A second side 118 of the second chamber 114 is separated from a first side 116 along a second direction D2 which is transverse to the first direction D1. An upper side 120 of the second chamber 114 is separated from a lower side 122 of the second chamber 114 along a third direction D3, transverse to the second direction D2 and the first direction D1.

In one embodiment, a first lower extension 124 and a second lower extension extend past a lower surface 126 of the steering wheel 110 from a region of the lower side 122 of the airbag 102, such that a portion of the lower surface 126 of the steering wheel 110 is positioned between the first lower extension 124 and the second lower extension (i.e., the first lower extension 124 is symmetrical to the second lower extension). In the illustrated embodiment, only the first lower extension 124 can be viewed. Further, the first lower extension 124 and the second lower extension extend away from a central area 128 of the lower side 122 of the airbag 102. Furthermore, a first upper extension 130 and a second upper extension (not shown) extend away from a central area 132 of the upper side 120 of the airbag 102 (i.e., the first upper extension 130 is symmetrical to the second upper extension). As illustrated, the central area 132 of the upper side 120 is a recessed surface 136 configured to align with at least a body portion of the occupant 134.

Figure 2:
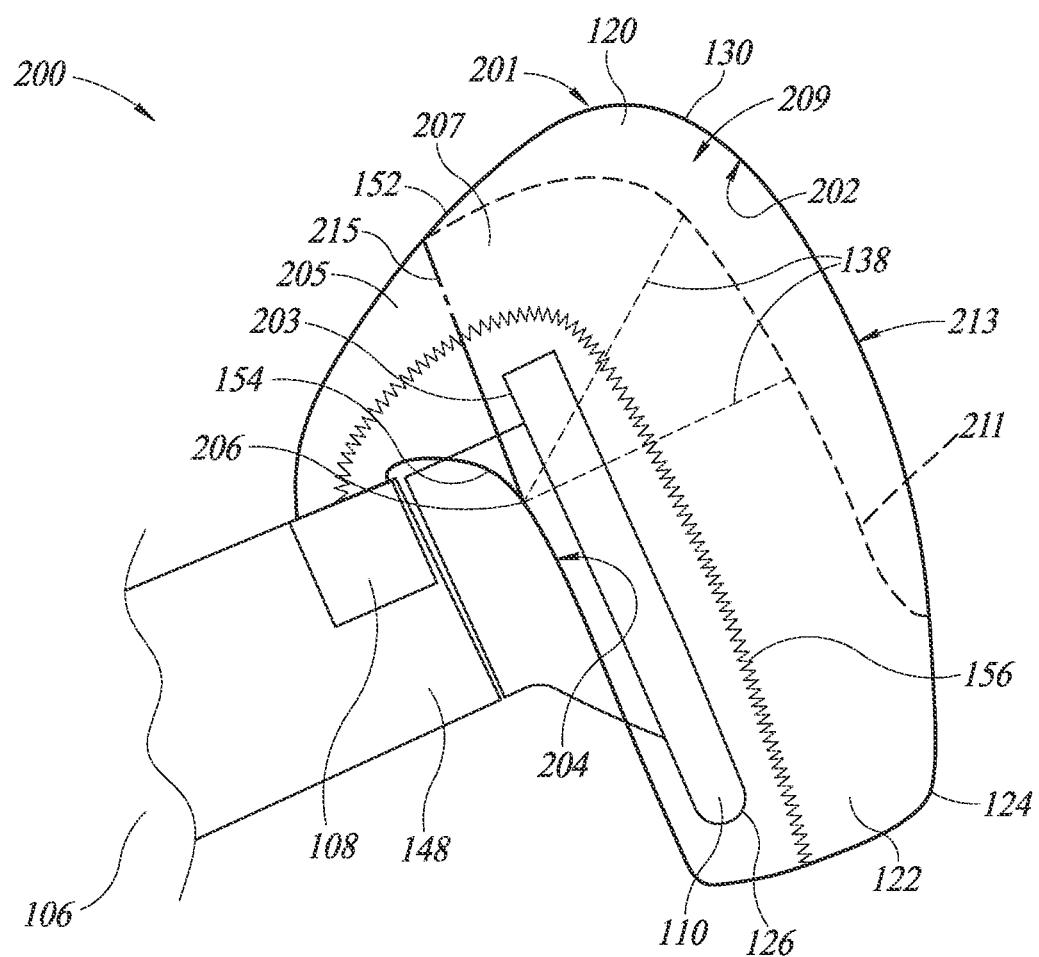
FIG. 2 is a side view of a deployed airbag in a vehicle interior in accordance with an alternative embodiment of the present disclosure.

FIG. 2 is a side view 200 of the airbag 201 deployed in a vehicle interior, in accordance with an alternative embodiment of the present disclosure. The steering column 148 extends from the instrument panel 106 into an interior of the vehicle. The steering column 148 includes the airbag housing 108, such that the airbag 201 extends from the airbag housing 108 when deployed, over an upper surface 203 of the steering wheel 110. The lower surface 126 of the steering wheel 110 extends into the interior of the vehicle such that the lower surface 126 is closer to the occupant's seat than the interior-most surface 144 of the instrument panel 106. The airbag 201 also includes a first lower extension 124 and a second lower extension that extends past the lower surface 126 of the steering wheel 110. The lower surface 126 of the steering wheel 110 is positioned between the first lower extension 124 and the second lower extension. The airbag 201 also includes a first upper extension 130 and a second upper extension that extend away from the central area 132 of the upper side 120 of the airbag 201.

The airbag 201 includes a first and a second chamber 205, 207. The first chamber 205 is coupled to the steering column 148 and is fixedly attached in the housing 108. The dashed line corresponds to a recessed surface 211, which may receive the occupant's face, head, and chest. The recessed surface 211 is closer to the steering wheel as compared to the exterior-most surface 213.

The airbag 201 includes a first panel of material 152 and the second panel of material 154 coupled through one or more attachment mechanisms, which may include stitching, adhesive bonding, or any other suitable attachment technique. In one example, the structural seam 156 couples the first panel of material 152 to the second panel of material 154. In the illustrated embodiment, the structural seam 156 may be viewed along a side or edge of the airbag 201 that extends from the steering column to the end of the airbag. Although not shown, the seam extends along a bottom of the airbag and along a side opposite to the visible side in FIG. 2. A strength of the first panel of material 152, the second panel of material 154, and that of the structural seam 156 should be substantially high to obtain an optimized design and functionality of the airbag 201.

In this embodiment, the baffle 146 is a third panel of material 215. The third panel of material 215 extends between an interior surface 202 of the first panel of material 152 and an interior surface 204 of the second panel of material 154. The third panel of material 215 is positioned between the instrument panel 106 and the airbag 201. The third panel of material 215 separates the first chamber 205 from the second chamber 207. The third panel of material 215 includes one or more openings.

The airbag 201 includes a plurality of internal tethers 138 coupled within the second chamber 207. The plurality of internal tethers 138 is configured to create a geometry of the airbag 201.

In order to provide reliable positioning for the airbag 201, the first chamber 205 has a greater stiffness than the second chamber 207. During deployment of the airbag 201, the stiffer first chamber 205 is configured to form a rigid structure that supports the second chamber 207 such that the second chamber 207 can effectively absorb energy during with minimal movement around the steering wheel 110. In one embodiment, the second chamber 207 is configured to receive a greater load or absorb more energy than the first chamber 205.

In order to accomplish the rigid structure for the first chamber 205, airflow to the second chamber 207 may be controlled by tuning one or more parameters of the third panel of material (the baffle) 215. A structure of one or more openings of the third panel of material 215 is selected to control pressure, volume and an inflation gas flowrate in the first and second chambers 205, 207. As a result, each of the first and second chambers 205, 207 may have a selected amount of volume, stiffness, or other suitable energy absorption properties manage and absorb an impact. In one example, the one or more openings may have varying vent designs such that the first chamber 205 may have a high pressure as compared to the second chamber 207. In another example, the one or more openings of the third panel of material 215 may include a flap structure integrally formed in at least a portion of the third panel of material 215 and configured to control the opening and closing of the respective opening. The opening and closing of the flap structure is at an angle with a surface of the baffle 215 to direct the airflow and create a higher pressure in the first chamber. The increased relative stiffness of the first chamber 205 allows the first chamber 205 to support the second chamber 207 and minimize rotation of the airbag 201 during deployment.

In one embodiment, the third panel of material 215, positioned between the first panel of material 152 and the second panel of material 154, divides the airbag 201 at an axis transverse to the longitudinal axis of the airbag 201. At such orientation, the third panel of material 215 allows a high pressure in the first chamber 205 and a low-pressure in the second chamber 207 such that the first chamber 205, during deployment of the airbag 201, acts as a rigid structural member against the second chamber 207.

The third panel of material 215 is attached to the interior surfaces 202, 204 of the first panel of material 152 and the second panel of material 154, respectively, through one or more attachments, for example, using suture, adhesion or through a hot pressing and/or forming thermal joints. It will be appreciated that the third panel of material 215 may be made up of coated fabric or high heat resistant fabric material or may be made up of the same material as the first panel of material 152 and/or the second panel of material 154.

In one embodiment, the third panel of material 215 and the plurality of tethers 138 positioned in the second chamber 207 may share a common attachment point 206 on the interior surface 204 of the second panel of the material 154, such that the third panel of material 215 is oriented transverse the plurality of the tethers 138. One or more of the tethers 138 may be substantially perpendicular to the baffle. The positioning of the third panel of material 215 maintains a high pressure in the first chamber 205, thereby conferring structural rigidity to the first chamber 205 and providing support to the airbag 201 when deployed. The third panel of material 215 and the plurality of tethers 138 may be attached to the interior surface 204 through any suitable attachment mechanism, for example, adhesion, or thermal coupling.

Figure 3:
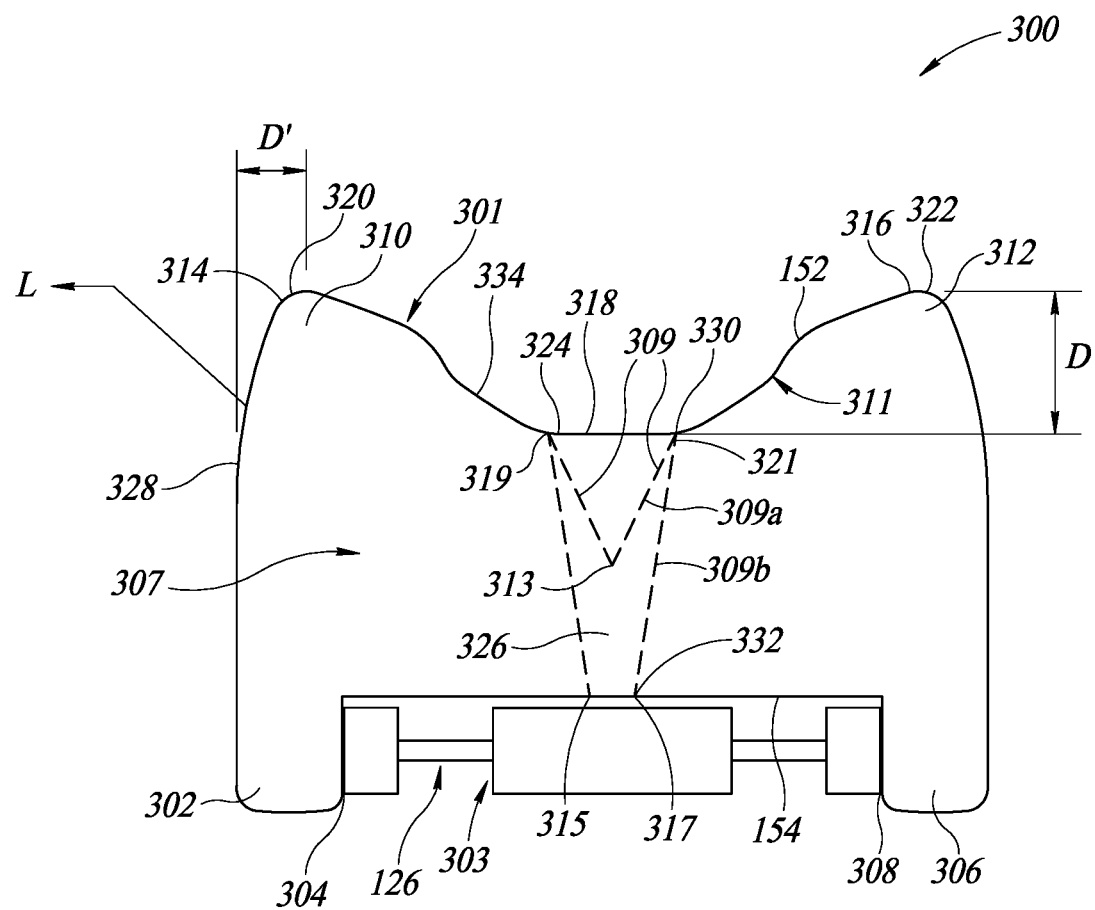
FIG. 3 is a front view of a deployed airbag in a vehicle interior, from an occupant's perspective in accordance with an embodiment of the present disclosure.

FIG. 3 is a front view 300 of an airbag 301 deployed in the vehicle interior 104, from an occupant's perspective in accordance with an embodiment of the present disclosure. The airbag 301 is sized and shaped to receive the occupant's shoulders initially and then other parts of the occupant in a central area 326 that is closer to the steering wheel than shoulder regions 310, 312. The airbag 301 is configured to be used with a non-circular steering wheel 303, where the airbag is stored in and deployed from a location that is separate from the steering wheel, such as in the instrument panel or in the steering column.

The airbag 301 includes a first extension 302 on a first side 304 of a steering wheel 303 and a second extension 306 on a second side 308 of the steering wheel 303. The first extension 302 is spaced from the second extension 306 by the steering wheel 303, such that the first extension 302 and the second extension 306 wrap around the first side 304 and the second side 308 of the steering wheel 303, respectively, in a way that the at least a portion of the steering wheel 303 is positioned laterally between the first extension 302 and the second extension 306. The first and second extensions 302, 306 are configured to provide position support for the airbag 301 during deployment as the airbag's positioning, directly in front of the occupant is imperative to occupant safety. Without the first and second extensions 302, 306, the airbag 301, as mounted to the instrument panel could shift left or right, such that the occupant would not interact with the airbag in a safe manner.

A third extension 310 aligns with the first extension 302 and a fourth extension 312 aligns with the second extension 306. The third extension 310 and the fourth extension 312 are further from the steering wheel 303 than the first extension 302 and second extension 306. An occupant facing surface 307 has a first shoulder-aligned surface portion 314 and a second shoulder-aligned surface portion 316 that corresponds to the third extension 310 and the fourth extension 312, respectively. It should be noted that in the event of vehicle impact, the third extension 310 is configured to align with a portion of the first shoulder of the occupant and the fourth extension 312 is configured to align with a portion of the second shoulder of the occupant 134 (shown in FIG. 1).

A centrally-aligned surface portion 318 is positioned between the third extension 310 and the fourth extension 312. The centrally-aligned surface portion 318 is a substantially curved region configured to centrally align with the occupant. Further, outer-most points 320, 322 of the first shoulder-aligned surface portion 314 and the second shoulder-aligned surface portion 316, respectively, are positioned further from the steering wheel 303 than an inner-most point 324 of the centrally-aligned surface portion 318. The airbag 301 has a curved surface that extends between points 320, 322.

The deployed airbag 301, when viewed from the driver's seat, includes a U-shaped region that corresponds to the first shoulder, the second shoulder, and the occupant's head. The third centrally-aligned surface portion 318 is formed by the plurality of tethers 309 coupled to interior surfaces of the airbag. Opposite ends of the plurality of tethers 309 couple to a central area 326 of the instrument panel facing surface 140.

In one embodiment, a first type of tethers 309a are used that are coupled to the curved surface 311 at locations between the outer-most points 320, 322. An opposite end of these tethers 309a are coupled together at a single location 313 on a back surface (instrument panel facing surface, not shown) of the interior of the airbag. When deployed, these tethers apply a tension to the occupant facing surface to create the curved surface of the airbag.

In another embodiment, a second type of tethers 309b may be implemented that are coupled to the curved surface at two different locations 319, 321. An opposite end of these tethers 309b is coupled to two different locations 315, 317 of the interior surface of the airbag. The two locations 315, 317 are closer to each other than the two locations 319, 321.

Further, the outer-most points 320, 322 of the first shoulder-aligned surface portion 314 and the second shoulder-aligned surface portion 316, respectively, are spaced from an inner-most point 324 of the centrally-aligned surface portion 318 by a distance D. Further, at least a surface region 328 on a left side portion L of the airbag 301 is spaced from an outer-most point 320 on the first shoulder-aligned surface portion 314 of the third extension 310 by distance D', such that during deployment the first shoulder-aligned surface portion 314 can effectively align with the first shoulder of the occupant 134 (shown in FIG. 1).

The lower surface 126 of the steering wheel 303 extends into the interior of the vehicle and is closer to the occupant's seat 150 than the interior most surface 144 of the instrument panel 106. The first and second extensions 302, 306 extend past the lower surface 126 of the steering wheel 303. The airbag 301 includes the first panel of material 152 and the second panel of material 154 having the plurality of tethers 309 therein. Each tether of the plurality of tethers 309 has a first end 330 coupled to the first panel of material 152 and a second end 332 coupled to the second panel of material 154. A distance between the first end 330 of each of the plurality of tethers 309 is greater than a distance between the second end 332 of each of the plurality of tethers 309. Further, the first end 330 of each of the plurality of tethers 309 is coupled to a central area 334 of the first panel of material 152 and the second end 332 of each of the plurality of tethers 309 is coupled to a plurality of locations on the second panel of material 154.

Figure 4:
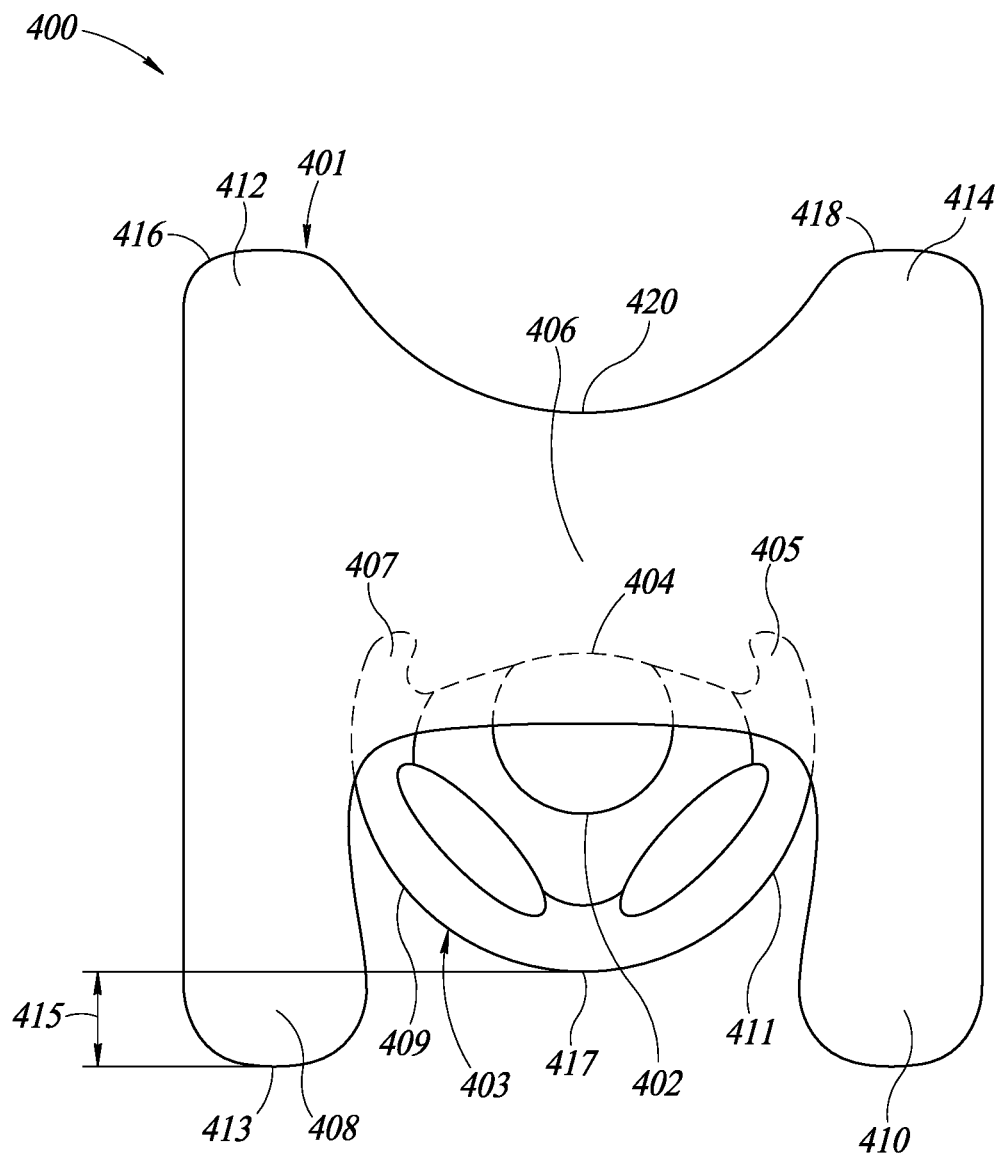
FIG. 4 is a front view of a deployed airbag in a vehicle interior, from an occupant's perspective in accordance with an alternative embodiment of the present disclosure.

FIG. 4 is a front view 400 of an airbag 401, from the occupant's perspective in accordance with an alternative embodiment of the present disclosure. The steering wheel 403 is coupled to the instrument panel 106 and is a non-circular steering wheel. The steering wheel 403 is truncated in that a top part of the steering wheel does not include a bar or hand-resting portion. Instead, the steering wheel includes truncated ends 405, 407 that extend from a central support 402. The steering wheel 403 may be coupled to the instrument panel 106, includes a first side 409, a second side 411, and the central support 402. The first and second sides 409, 411 are attached together to make a curved shape, thereby forming curved sides of the steering wheel 403. The steering wheel 403 also includes an upper bar 404, spaced from the central support 402 that extends between the curved sides. The bar is between the ends 405, 407.

The airbag 401 is configured to deploy over the upper bar 404 of the steering wheel 403 to separate the occupant from the steering wheel in a collision. A single occupant facing chamber includes a first protrusion 408 and a second protrusion 410, from a central body 406. The first and second protrusions 408, 410 extend along the first side 304 and the second side 308 of the steering wheel 403, respectively, into an area where the driver or occupant may have been holding onto the steering wheel. In this embodiment, an end 413 of the first protrusion 408 extends past an end 417 of the steering wheel by a distance 415 in a first direction. This keeps the airbag in position with respect to the steering wheel 403 when deployed.

Similarly, a third protrusion 412 and a fourth protrusion 414, from the central body 406, extend above the first side 304 and the second side 308 of the steering wheel 403, respectively. As shown, a first surface portion 416 that corresponds to the third protrusion 412 and a second surface portion 418 that corresponds to the fourth protrusion 414 are higher or otherwise spaced further from the ends of the first and second protrusions 408, 410. A third surface portion 420 that corresponds to the central body 406 extends into the vehicle interior with the other extensions and protrusions of this single volume to receive the driver. It should be noted that the third surface portion 420 is closer to the steering wheel than the first surface portion 416 and the second surface portion 418.

Figure 5:
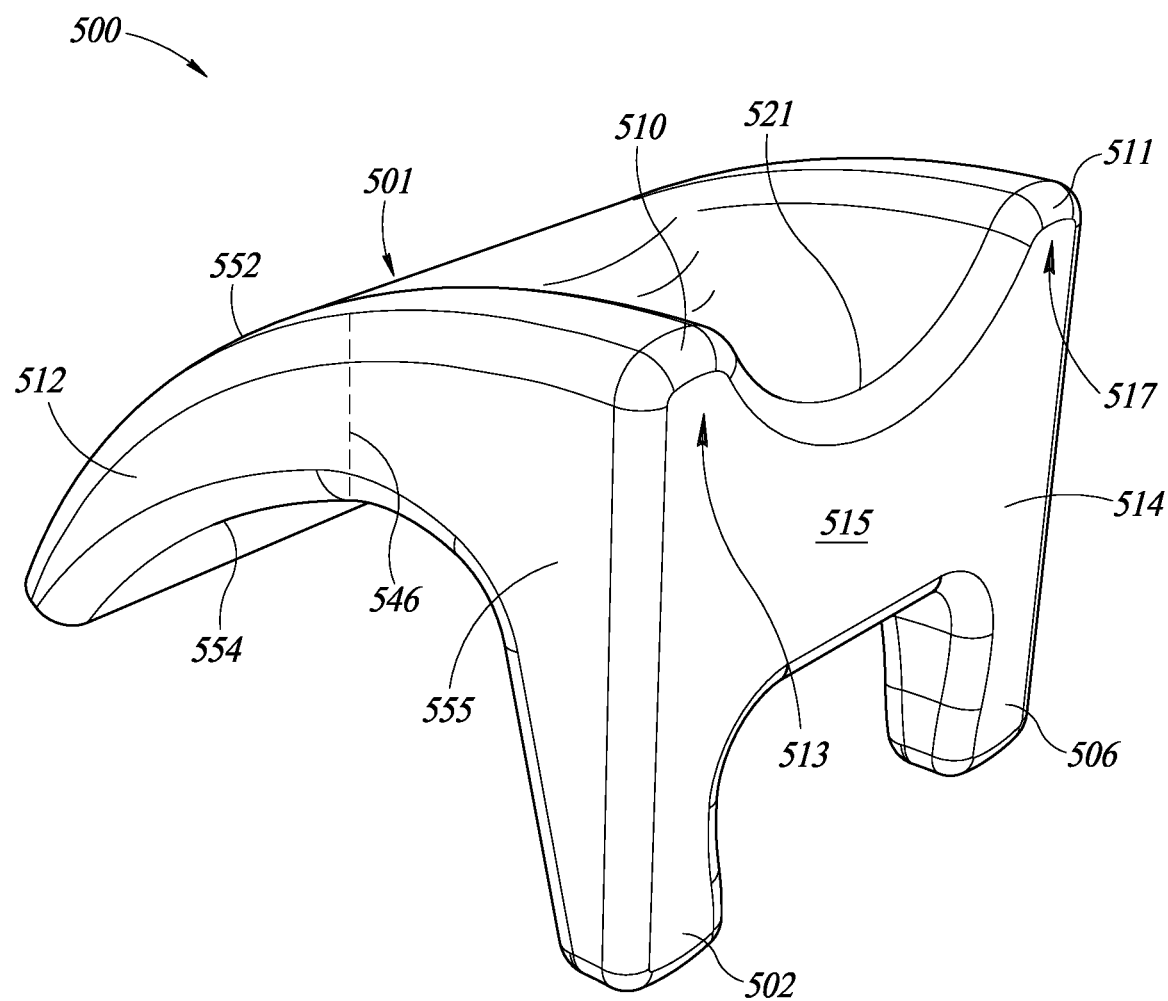
FIGS. 5 and 6 are perspective side and front views of a deployed airbag in a vehicle interior in accordance with an embodiment of the present disclosure.
Figure 6:
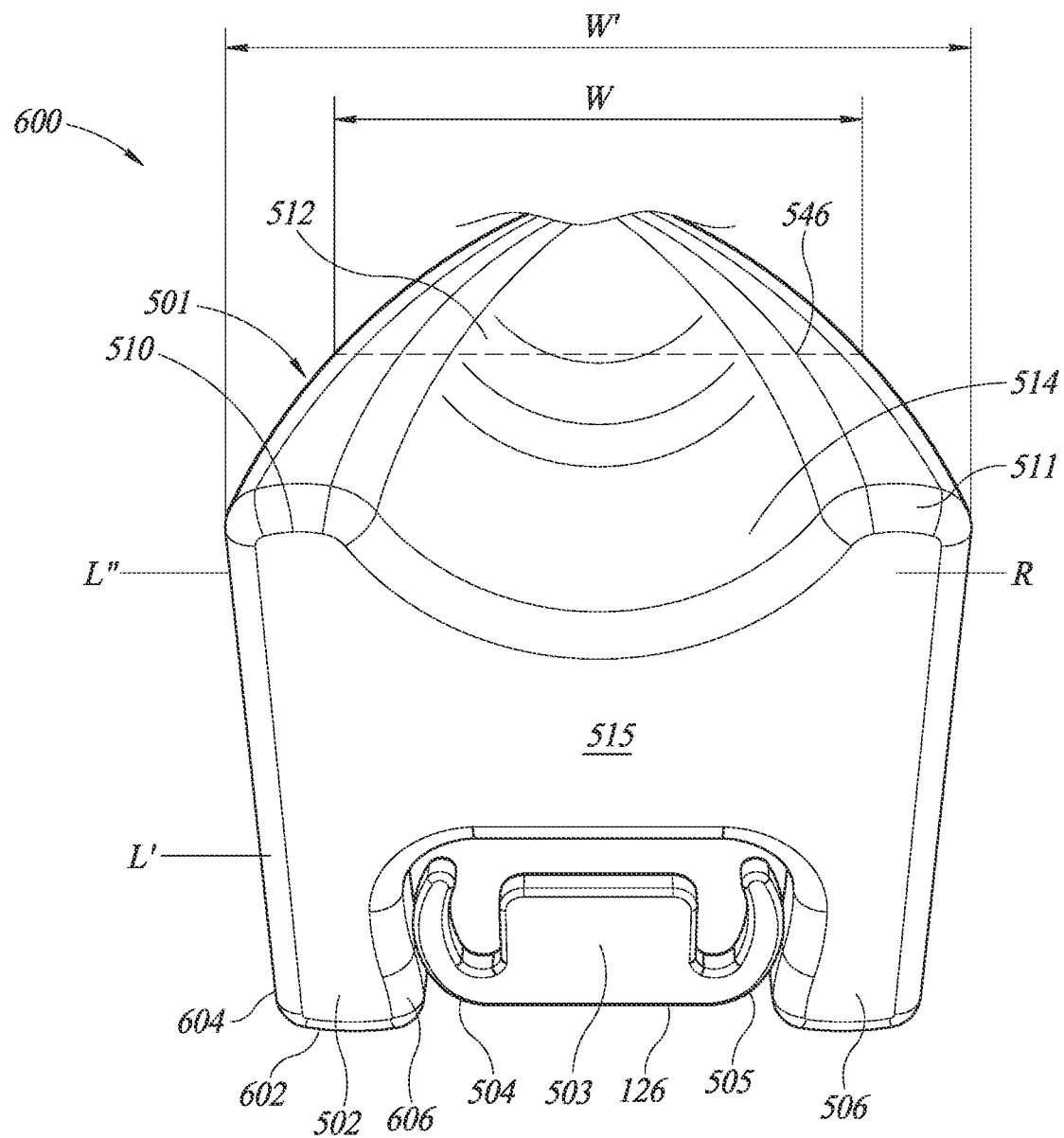

FIGS. 5 and 6 are a perspective side view 500 of an airbag 501 and a front view 600 in accordance with an embodiment of the present disclosure. This airbag 501 is configured to deploy from a storage location in either the instrument panel or from a steering column, which are not shown. Similar to the above embodiments, this airbag 501 includes a first chamber 512 and a second chamber 514, which has a larger volume and different shape than the first chamber 512. The first chamber 512 is stiffer and more supportive than the second chamber 514 in that the first chamber 512 provides the support and structure for the second chamber 514 that is to receive the driver or occupant. A baffle or internal air flow barrier 546 separates the first chamber 512 from the second chamber 514.

In one embodiment, the airbag 501 includes the first panel of material 552 and the second panel of material 554 coupled together through the one or more attachment mechanism to construct the airbag 501. A seam between the first and second panel of material may extend along a side 555 of the airbag 501.

The airbag includes a first lower extension 502 that extends beside and past a first side 504 of a steering wheel 503. A second lower extension 506 wraps around a second side 505 of the steering wheel 503, such that the at least portion of the steering wheel 503 is laterally positioned between the first and second extensions 504, 505. Each of the first and second extensions includes curved surfaces and corners to more gently interact with the occupant.

The first and second extensions are part of the second chamber and extend away from a central body 515. A third upper extension 510 aligns with the first extension 502, and a fourth upper extension 511 aligns with the second extension 506. Further, the first shoulder-aligned surface portion 513 and the second shoulder-aligned surface portion 517 of the airbag 501 correspond to the third and fourth extensions 510, 511, respectively. The first shoulder-aligned surface portion 513 is configured to interact with the occupant's first shoulder. The second shoulder-aligned surface portion 517 is configured to interact with the occupant's second shoulder. A third centrally positioned surface portion 521, positioned between the third extension 510 and the fourth extension 511, forms a valley with a curved surface such that at least a region of the third surface portion conforms to the occupant's head and is thereby configured to interact with the occupant's head during the event of an impact.

The first extension 502 of the airbag 501, also referred to as the first lower extension, extends laterally from a left portion L' on the lower side of the airbag 501. Further, the second extension 506 of the airbag 501, also referred to as the second lower extension extends laterally from a right, lower side of the airbag 501. The first lower extension 502 and the second lower extension 506 extend away from the central area 515 of the lower side. Also, the first lower extension 502 is spaced from the second lower extension 506 by the central area of the lower side. The third extension 510 of the airbag 501, also referred to as the first upper extension, extends laterally upwardly from a left portion L" on the upper side of the airbag 501. Further, the fourth extension 511 of the airbag 501, also referred to as the second upper extension extends laterally and upwardly from a right portion R on the upper side of the airbag 501. The first and second upper extensions extend away from the central area of the upper side.

The lower surface of the steering wheel 503 extends into the interior of the vehicle. The lower surface is closer to the occupant's seat than the interior most surface of the instrument panel. The first and second lower extensions 502, 506 extend past the lower surface of the steering wheel 503. Further, the first extension 502 includes a first surface 602 that extends past the lower surface of the steering wheel 503, a second surface 604 that is transverse to the first surface 602, and a third surface 606 that is opposite to the second surface 604 and transverse to the first surface 602. At least a surface region of the first extension 502 and a surface region of the second extension wraps around to a left-side portion 504 and a right-side portion 505, respectively, of the lower surface of the steering wheel 503. A portion of the steering wheel 503 is laterally positioned between the first extension 502 and the second extension 506.

In one embodiment, the first chamber 512 of the airbag 501 has a first dimension at a widest part W of the first chamber 512 and the second chamber 514 of the airbag 501 has a second dimension at a widest part W' of the second chamber 514. The first dimension is less than the second dimension. The baffle, positioned at the widest part W of the first chamber 512, separates the first chamber 512 from the second chamber 514. This advantageously provides support to the occupant 134 (shown in FIG. 1) over a larger area on the second chamber 514, particularly, when the occupant 134 is not centrally positioned at the time of the vehicle impact. It should be noted that the larger area is dimensioned along a vehicle transverse direction.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    an instrument panel; and
    an airbag coupled to the instrument panel having:
        a first chamber; and
        a second chamber spaced from the instrument panel by the first chamber along a first direction, the second chamber having:
            a first side separated from a second side along a second direction that is transverse to the first direction;
            an upper side separated from a lower side along a third direction that is transverse to the second direction and the first direction;
            a plurality of tethers within the second chamber, each tether coupled between a central area of the lower side and a central area of the upper side;
            first and second lower extensions extend away from the central area of the lower side, the first lower extension spaced from the second lower extension by the central area of the lower side; and
            first and second upper extensions extend away from the central area of the upper side, the first upper extension spaced from the second upper extension by the central area of the upper side.

2. The system of claim 1, further comprising a baffle positioned between the first and second chambers.

3. The system of claim 2, wherein the baffle is positioned between the instrument panel and a steering wheel.

4. The system of claim 1, further comprising:
    a steering column extending from the instrument panel into an interior of a vehicle;
    a driver's seat; and
    a steering wheel coupled to the steering column, the steering wheel includes a lower surface that extends into the interior of the vehicle, the lower surface being closer to the driver's seat than an interior most surface of the instrument panel, the first and second lower extensions extend past the lower surface of the steering wheel.

5. The system of claim 4, further comprising:
an airbag housing in the instrument panel, the airbag being coupled to the airbag housing and the airbag further including:
a first panel of material and a second panel of material that are coupled together; and
a third panel of material that extends between interior surfaces of the first panel and the second panel, the third panel separates the first chamber from the second chamber.

6. The system of claim 5, wherein the third panel includes a plurality of openings.

7. A system, comprising:
a steering wheel;
an instrument panel; and
an airbag housing coupled to the instrument panel, the airbag housing includes:
an airbag having:
a first extension on a first side of the steering wheel;
a second extension on a second side of the steering wheel, the first extension being spaced from the second extension by the steering wheel;
a third extension aligned with the first extension; and
a fourth extension aligned with the second extension, the third and fourth extensions being further from the steering wheel than the first and second extensions.

8. The system of claim 7, wherein the airbag includes:
an instrument panel facing surface;
an occupant facing surface that is opposite to the instrument panel facing surface, the occupant facing surface including the third and the fourth extensions; and
a centrally-aligned surface that is positioned between the third and fourth extensions.

9. The system of claim 8, wherein the airbag includes a plurality of tethers positioned between the instrument panel facing surface and the occupant facing surface.

10. The system of claim 9, wherein outer-most points of first and second shoulder-aligned surface portions are positioned further from the steering wheel than an inner-most point of the centrally-aligned surface portion.

11. The system of claim 10, wherein the centrally-aligned surface portion is coupled to ends of the plurality of tethers, opposite ends of the plurality of tethers are coupled to a central area of the instrument panel facing surface.

12. The system of claim 9, wherein outer-most points of first and second shoulder-aligned surface portions are spaced from an inner-most point of the centrally-aligned surface portion by a distance.

13. The system of claim 7, wherein:
the steering wheel further includes an upper surface and a lower surface; and
the first extension further includes:
a first surface that extends past the lower surface of the steering wheel;
a second surface that is transverse to the first surface; and
a third surface that is opposite to the second surface and transverse to the first surface.

14. The system of claim 13, wherein the third surface faces the steering wheel.

15. A system, comprising:
a vehicle interior;
an instrument panel;
a steering wheel coupled to the instrument panel, the steering wheel having:
a central support;
a first side and a second side; and
an upper bar that extends between the first and second sides, the bar being spaced from the central support; and
an airbag coupled to the instrument panel and configured to deploy over the upper bar of the steering wheel, the airbag including:
a first chamber;
a baffle; and
a second chamber coupled to the first chamber and separated from the first chamber by the baffle, the second chamber including:
a central body that overlaps at least a portion of the steering wheel;
a first protrusion from the central body that extends along the first side of the steering wheel; and
a second protrusion from the central body that extends along the second side of the steering wheel.

16. The system of claim 15, wherein the second chamber includes:
a third protrusion from the central body that extends above the first side of the steering wheel;
a fourth protrusion from the central body that extends above the second side of the steering wheel;
a first surface portion that corresponds to the third protrusion that extends into the vehicle interior;
a second surface portion that corresponds to the fourth protrusion that extends into the vehicle interior; and
a third surface portion that corresponds to the central body that extends into the vehicle interior less than the first surface portion and the second surface portion.

17. The system of claim 16, wherein the first chamber has a first dimension at a widest part of the first chamber and the second chamber has a second dimension at a widest part of the second chamber, the first dimension being less than the second dimension.

18. The system of claim 17, wherein the baffle is positioned at the widest part of the first chamber.

19. The system of claim 18, wherein the airbag includes a first material panel and a second material panel, the second chamber includes a plurality of tethers within the second chamber, each tether having a first end coupled to the first material panel and a second end coupled to the second material panel.

20. The system of claim 19, wherein a distance between the first ends of the plurality of tethers is less than a distance between the second ends of the plurality of tethers.

21. The system of claim 19, wherein the first ends are coupled to a central area of the first material panel and the second ends are coupled to a plurality of locations on the second material panel.

* * * * *